United States Patent
Kobiela et al.

(10) Patent No.: US 6,913,303 B2
(45) Date of Patent: Jul. 5, 2005

(54) MOUNTING SYSTEM FOR A MOTOR VEHICLE

(75) Inventors: Andreas Kobiela, Neckartenzlingen (DE); Thomas Seeg, Ostfildern (DE); Werner P. Schlecht, Vaihingen/Enz (DE)

(73) Assignee: BOS GmbH & Co., KG, Ostfildern (DE)

( * ) Notice: Subject to any disclaimer, the term of this patent is extended or adjusted under 35 U.S.C. 154(b) by 0 days.

(21) Appl. No.: 10/643,007

(22) Filed: Aug. 18, 2003

(65) Prior Publication Data

US 2004/0119307 A1 Jun. 24, 2004

(30) Foreign Application Priority Data

Aug. 19, 2002 (DE) .......................................... 102 38 613

(51) Int. Cl.⁷ ................................................. B60R 5/04
(52) U.S. Cl. ..................... 296/1.01; 296/37.16; 296/98; 160/370.22
(58) Field of Search ...................... 296/1.01, 98, 37.16, 296/24.43, 52, 100.4, 190.11; 410/144; 160/370.22, 323.1

(56) References Cited

U.S. PATENT DOCUMENTS

| | | | | |
|---|---|---|---|---|
| 3,578,378 A | * | 5/1971 | Anderson | 296/100.04 |
| 3,923,334 A | * | 12/1975 | Key | 296/10 |
| 3,944,097 A | * | 3/1976 | Savage | 414/469 |
| 4,587,695 A | | 5/1986 | Jensen | |
| 5,350,213 A | * | 9/1994 | Bernardo | 296/98 |
| 5,618,077 A | * | 4/1997 | Ament et al. | 296/37.16 |
| 5,735,564 A | * | 4/1998 | Coogan | 296/24.43 |
| 6,325,436 B1 | * | 12/2001 | Ehrenberger et al. | 296/24.4 |
| 6,343,828 B1 | * | 2/2002 | Young et al. | 296/100.1 |
| 6,550,849 B1 | * | 4/2003 | Dosdall | 296/183.1 |

FOREIGN PATENT DOCUMENTS

| | | |
|---|---|---|
| DE | 297 16 241 | 3/1998 |
| JP | 09086280 | 3/1997 |
| JP | 10329610 | 12/1998 |

* cited by examiner

*Primary Examiner*—D. Glenn Dayoan
*Assistant Examiner*—Greg Blankenship
(74) *Attorney, Agent, or Firm*—Flynn, Thiel, Boutell & Tanis, P.C.

(57) ABSTRACT

A mounting system for a motor vehicle which is connected force-transferringly to at least one vehicle-fixed retaining device by means of at least one locking device. The at least one locking device has at least two locks.

19 Claims, 8 Drawing Sheets

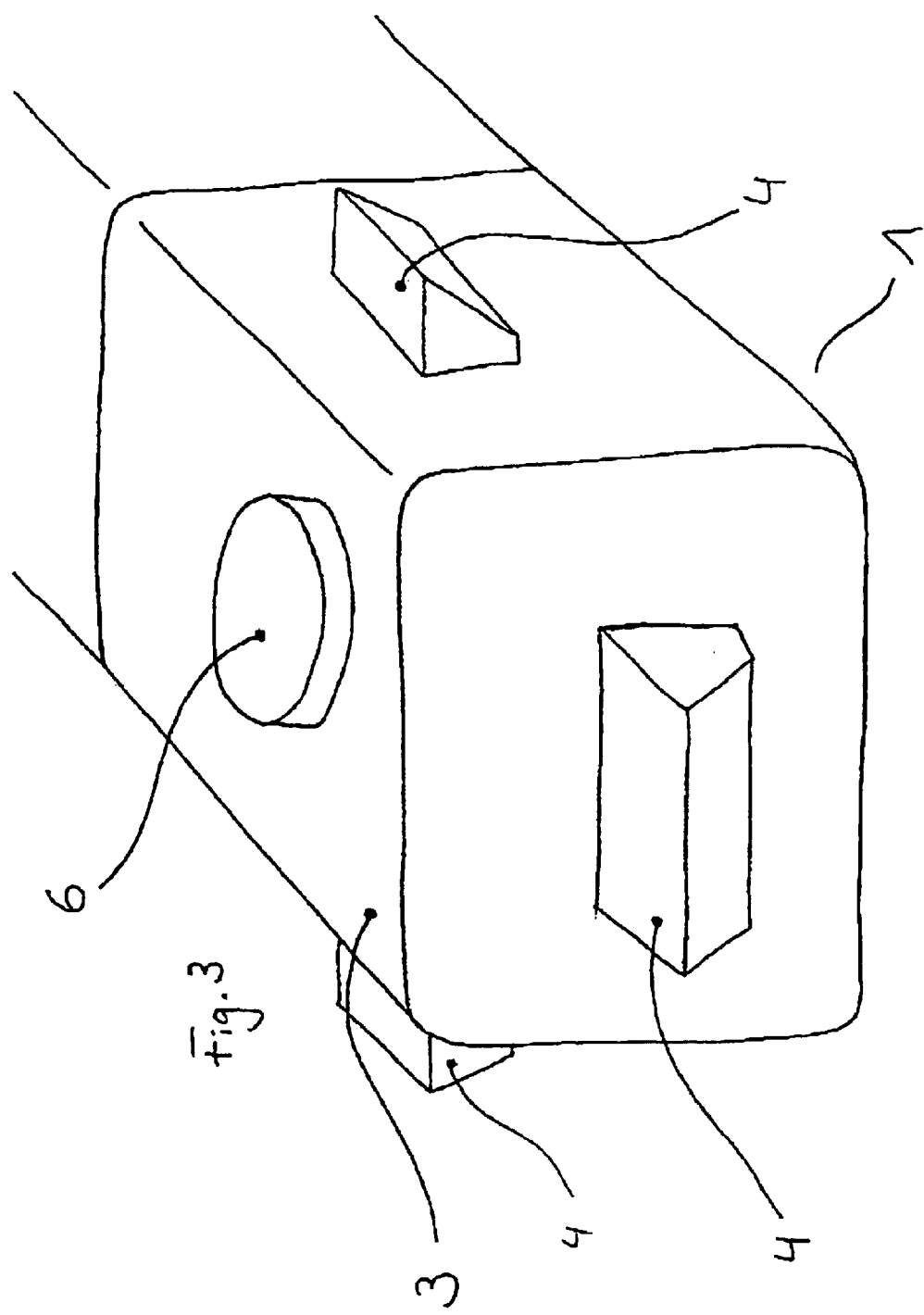

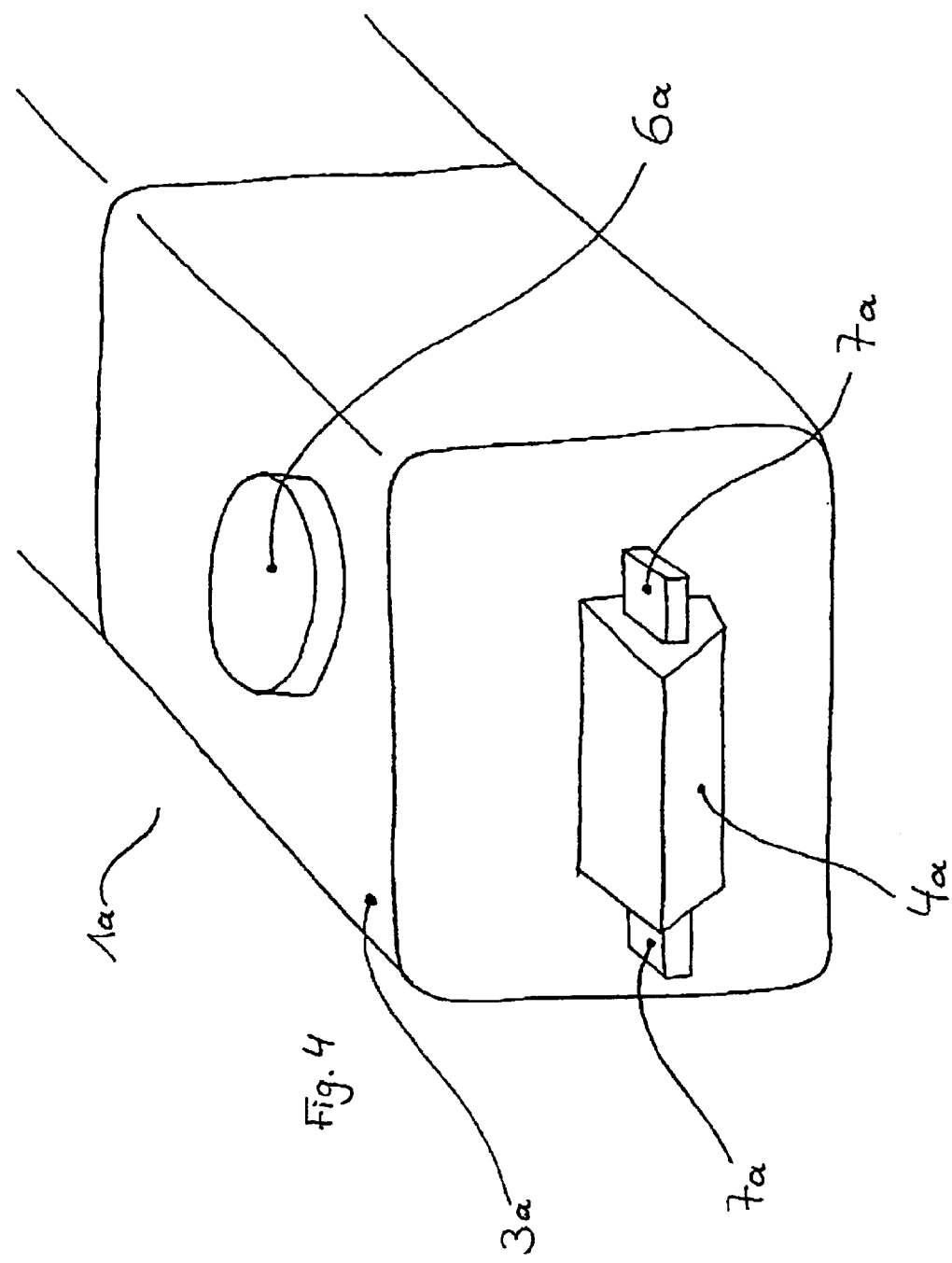

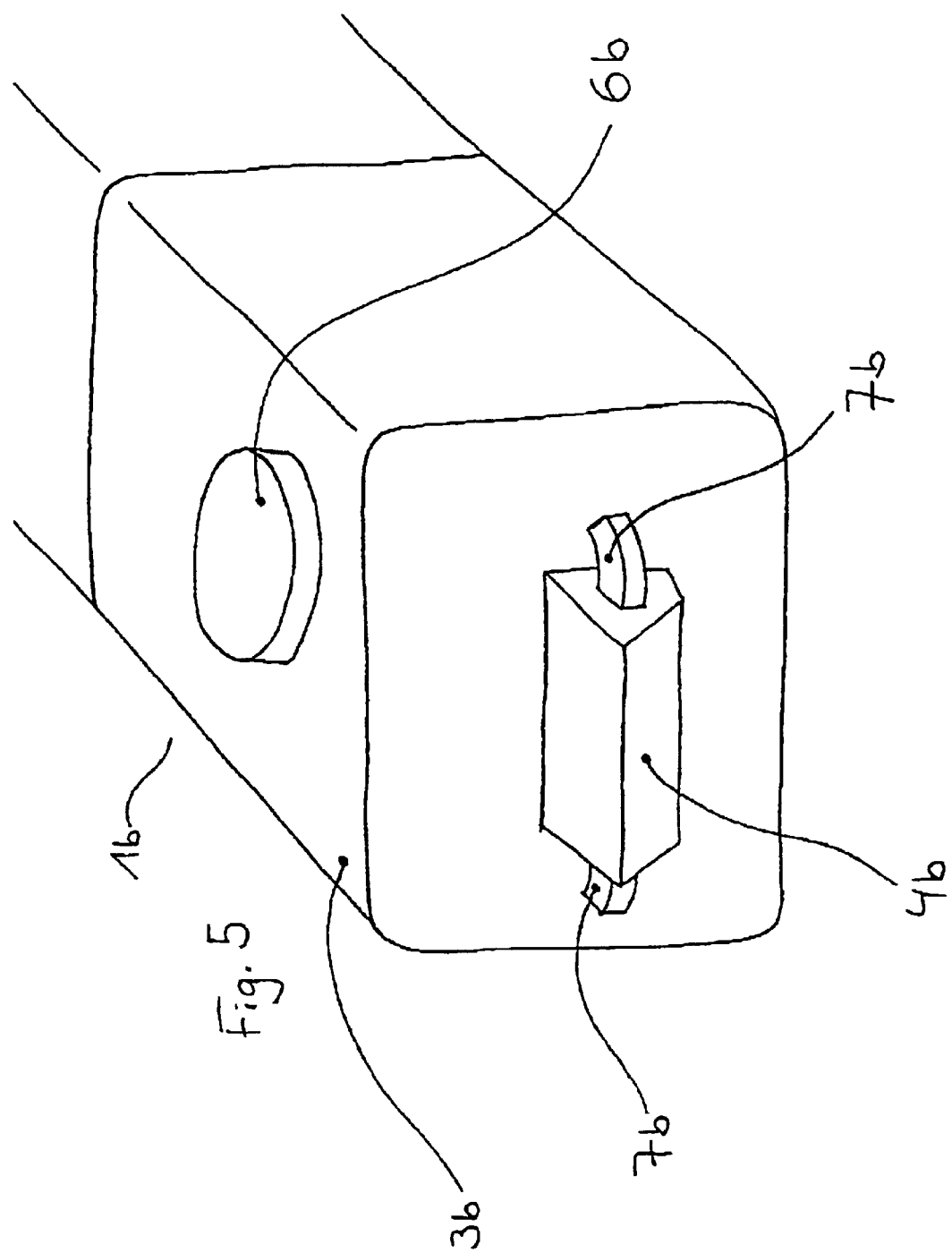

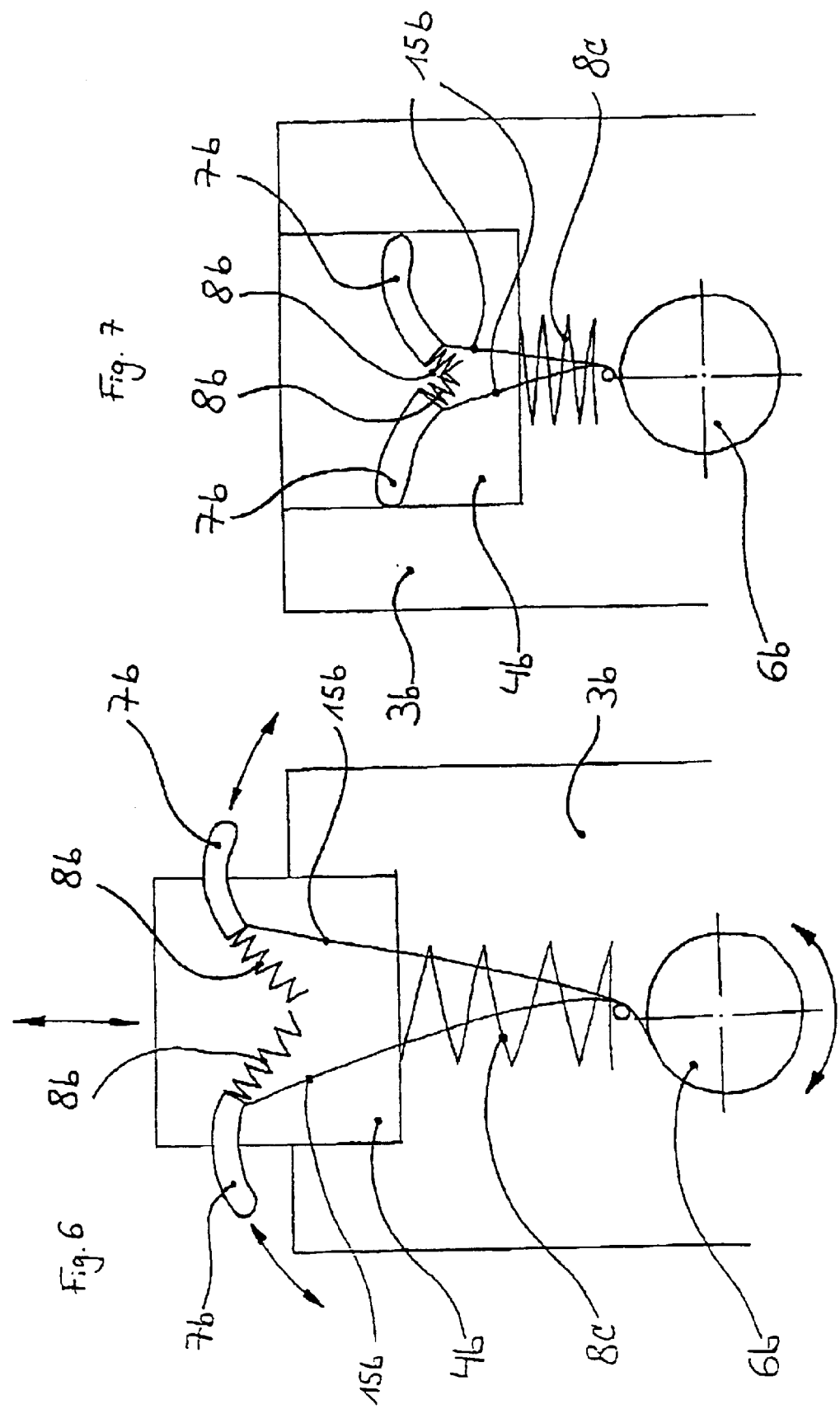

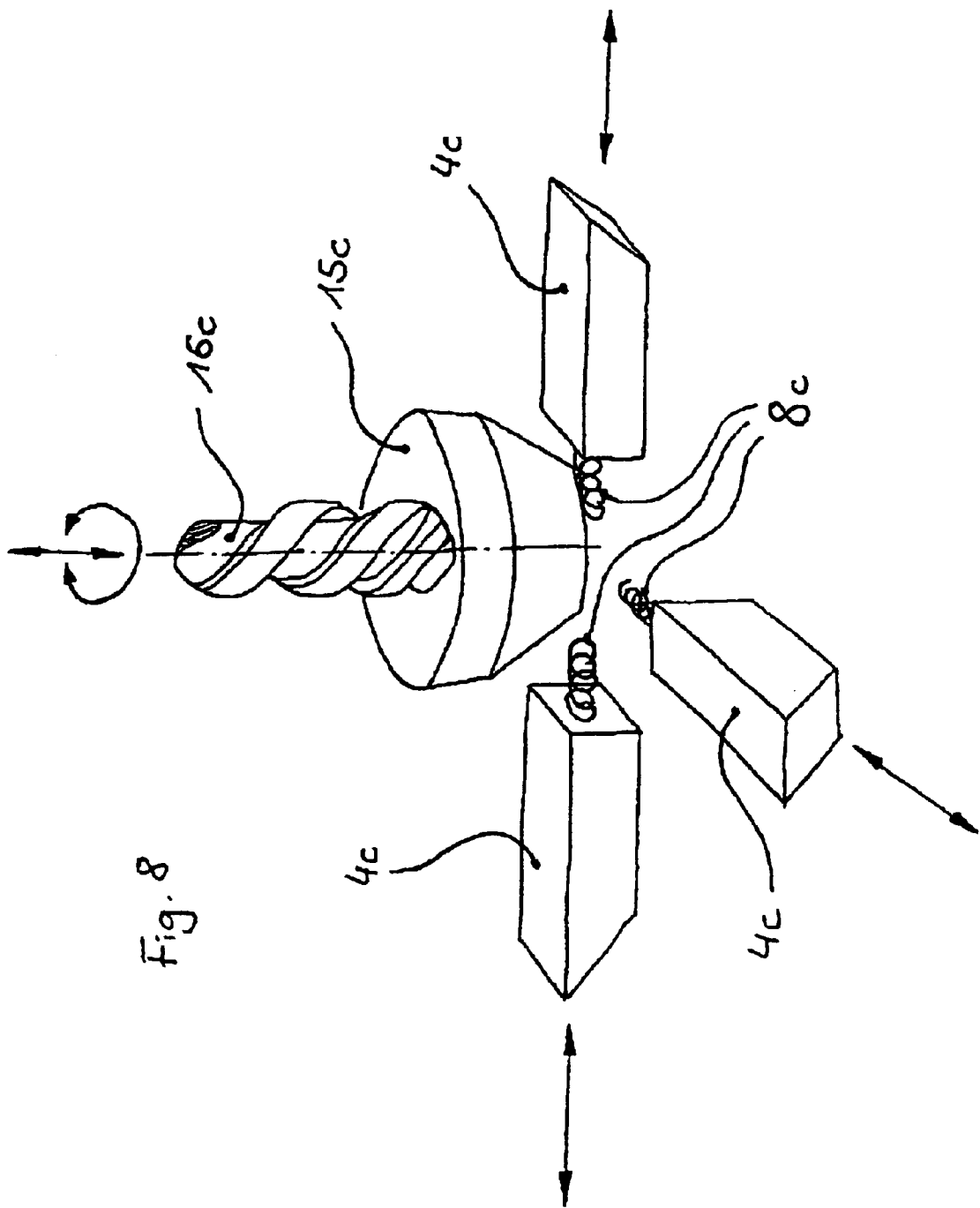

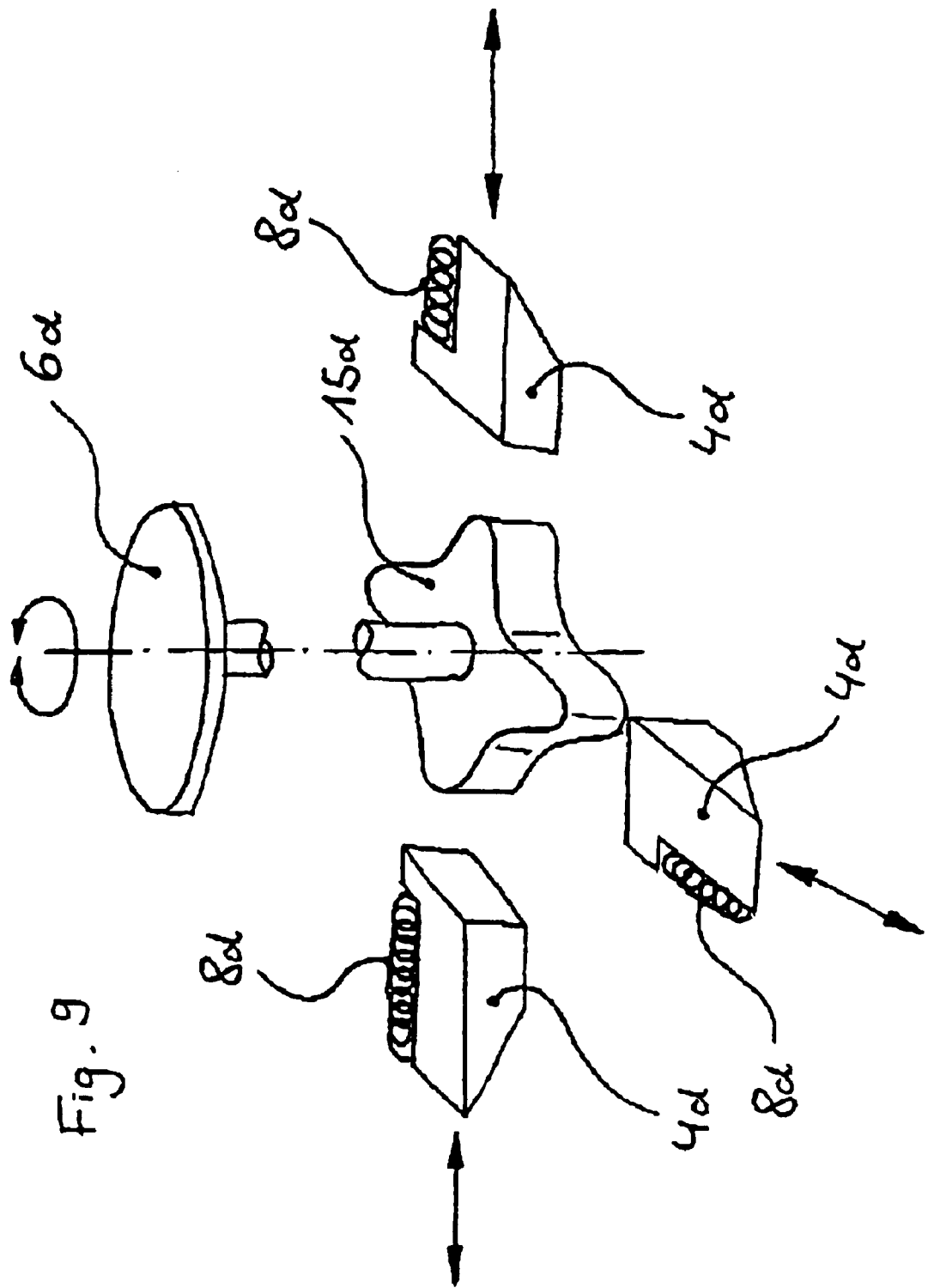

MOUNTING SYSTEM FOR A MOTOR VEHICLE

FIELD OF THE INVENTION

The invention relates to a mounting system for a motor vehicle which is releasably connected to at least one vehicle-fixed retaining device by means of at least one locking device.

BACKGROUND OF THE INVENTION

Mounting systems for motor vehicles are known in many different designs. They are widely used in particular as magazine housings for sun-protection rolls or safety nets to separate the cargo space into sections. Other uses as for example the mounting of ventilation, climate-control, sound or safety systems are also conceivable. In order to facilitate an as great as possible utilization of the inside space of a motor vehicle, the mounting systems are often connected to vehicle-fixed retaining devices by means of locking devices which can be released in particular without the use of tools. A locking condition is thereby desired in which the mounting system is connected force-transferringly at least in such a manner to the motor vehicle that in a general operating state of the motor vehicle, in particular during the normal driving operation without any further outside influences, the forces acting onto the mounting system cannot result in a release of the locking condition. Vehicle-fixed retaining devices are directly mounted to the body of the vehicle, in particular, they are integrated into the supporting structure of the body of the vehicle or are connected directly to the body of the car through connecting means.

The purpose of the invention is to provide a mounting system of the above-identified type which enables a safe and secure vehicle-side anchoring even during strong vehicle impact loads.

SUMMARY OF THE INVENTION

The purpose is attained by providing at least one locking device having at least two locks or latches. The locking device, which creates in particular through force and/or form lock a force-transferring connection between the mounting system and the vehicle-fixed retaining device, has according to the invention at least two locks, whereby each lock permits a transfer of force at least in one direction. Typical lock designs are in particular controlled force acting bolts, hooks or slide bars. Through the common engagement of one locking system by means of at least two locks, and compared with one single lock of a comparable lock design, an improved anchoring is achieved, in particular at least one force or torque component can be additionally absorbed. With this a clear improvement of the force-transferring connection of the mounting system to the vehicle-fixed retaining device is accomplished with little extra expense.

The at least two locks or latches are in one embodiment of the invention movably supported independently of one another. With this it can be guaranteed that the release or the creation of the force-transferring connection between the mounting system and the vehicle-fixed retaining device can be designed particularly simple, especially when due to structural conditions one of the locks must be moved earlier into the locking condition than the other lock or locks, or when one of the locks is to carry out a larger movement than the other lock or locks.

The at least two locks are in a further embodiment of the invention movably supported in different directions. With this different forces and loads can be spacially well balanced so that an improved anchoring results. In contrast to conventional locking devices, such an arrangement of the at least two locks enables all occurring force and moment directions to be absorbed by the locking device without an unintended release of the connection between the mounting system and the vehicle-fixed retaining device taking place. By suitably dimensioning the locking device, deformation forces and moments applied to the body of the motor vehicle to result in an unlocking of the mounting system can be prevented, in particular during an accident of the motor vehicle.

At least one lock is in a further embodiment of the invention controlled by a guiding device in such a manner that it carries out a linear and/or arcuate locking movement. A guiding device limits through guiding means, in particular sliding guides or ball guides, the mobility of the lock and removes both operating forces, which are applied by the user of the vehicle, and also reaction forces which occur during use of the mounting system, so that undesired locking movements are essentially prevented. The type of movement of the lock depends on its design. While bolts and slide bars are suited for a linear movement in order to create a form locking, one must, in particular in the case of hooks and snap hooks, start from a combined linear and arcuate movement. In contrast, in particular T-shaped locks are guided linearly through an opening at the fastening point, a form lock with the fastening point is thereafter accomplished by gripping behind a suited area through an arcuate locking movement. It is also conceivable to utilize a screw-like locking device, where one lock is screwed into a corresponding receiving means at the fastening point through a combined linear and arcuate locking movement, thus a particularly reliable connection is achieved.

The guiding device has in a further embodiment of the invention an operating device which force and/or form-lockingly controls the lock for locking and/or unlocking. The operating system is used to transfer an operating force applied by the user of the vehicle onto at least one lock of the locking device, whereby the operating system can be in particular a lever, a control knob, a key or a pull loop. The operating force applied by the user of the vehicle or a corresponding operating moment is transferred by the operating system either directly onto the lock or is transferred by the guiding device into a different force or moment form in order to then act indirectly onto the lock.

The force transfer onto a lock can occur form-lockingly and/or force-lockingly depending on geometric requirements and on an operating concept which includes in particular a chronological sequence of different locking or unlocking movements. A combination of form and force locking can be utilized in particular when it is to be prevented that the user of the vehicle causes, due to operating forces on the operating system which are too high, an overload of the locking device. This is accomplished in a particularly advantageous manner by the locking movement taking place utilizing controlled force applying structure, so that a limiting of the transferred force onto the lock can be realized. The unlocking movement is caused by a conforming configuration acting element.

The operating system has in a further embodiment of the invention automatic control means which act onto at least one lock to facilitate locking and/or unlocking. During the application of a controlled force, in particular a connecting link guide, a spindle drive or a gearing, there exists a fixed connection between the operating system and the lock. Automatic control means cause as part of the guiding device the lock to no longer have a degree of freedom of movement as long as no active operation of the operating system exists. This has the result that on the one hand, in particular also during an increased friction through wear or initial load of the locking device, a safe locking can be guaranteed. The force transferred by the user of the vehicle onto the operating element acts for both the locking and also the unlocking movement proportionally onto the lock and guarantees in this manner, with an increase of the operating force, an increase of the effective locking force during the locking and unlocking operation. On the other hand, due to the force control there is created a reactive coupling which is visible and sensible for the user of the vehicle, regarding the locking condition during the locking and unlocking operation. With each locking position there is also associated a directly coupled operating-element position.

One lock has in a further embodiment of the invention at least one side lock. This side lock is preferably structurally integrated into the lock. Depending on the function of the mounting system there exists already during the normal operating state of the motor vehicle a force direction in which most forces acting onto the mounting system occur. Also a specific force direction can be provided through the action of the mounting system during an accident. In particular when using the mounting system as a magazine housing for a safety net for a cargo space of a motor vehicle, there is created a particularly strong load through reaction forces which are caused in particular through unsecured luggage pieces during an accident.

In order to favorably design a locking device for such a primary force direction, a lock can be provided which is suited in particular for absorbing forces from this primary force direction. However, in order to further also assure that force components acting in other directions do not result in an unlocking of the mounting system, the lock has at least one side lock which can be swung out of the lock or can be driven out of the lock, and which is utilized to compensate for the forces apart of the primary force direction. Moreover the at least one side lock can also prevent an unlocking movement of the lock by the side lock completely preventing an unintended movement of the lock.

At least one lock is in a further embodiment of the invention initially tensioned by a spring element which acts in or against the locking direction. Spring elements, in particular spiral springs, cup springs, tape tension springs, torsion springs or leaf springs, store physical work in the form of deformation energy and facilitate application of force. In this manner, depending on the structural design of the locking device, a particularly user-friendly operation of the lock can be released. This is particularly true when the lock is to be held in a locking position by spring force and is moved out of this locking position only during the unlocking operation by controlled force applying operating means.

It is also conceivable to provide a modification in which the at least one lock is held in an unlocked position by a spring element and can be moved into a locking position by force or a controlled force applying operating means. This also results in a user-friendly operating concept by the mounting system being inserted into the vehicle-fixed retaining devices without applying an operating force, and thereafter in a second step by operating the operating system a force is applied onto the lock against the spring force so that the lock can be moved into a blocking position. For unlocking it is then merely necessary to reduce the applied operating force so much that the spring force can move the lock into the unlocked position, which can be accomplished in a simple manner in particular by pushing a button or by operating a corresponding operating lever.

At least one lock with blocking means is held in a further embodiment of the invention in a locking position. The blocking means act either directly onto the lock, onto the operating system or onto the operating means. The blocking means can prevent the lock from being moved out of its locking position through an unintended operation or unfavorable reaction load force or through vibration occurring during the operating state of the motor vehicle. The blocking means can force and/or apply a controlled force onto the lock. Particularly suited are especially bolts, which act transversely with respect to the unlocking direction of the lock and thus reliably prevent an unlocking movement. The blocking means are designed in a particularly preferred embodiment in such a manner that they act self-lockingly and thus produce during an increasing load also further increasing blocking forces.

The operating system has in a further embodiment of the invention a rotary-motion or sliding-motion operating element for facilitating locking and/or unlocking. Depending on the type of locks and the geometric design of the locking device and of the vehicle-fixed retaining device, a corresponding control of the locks by an operating element is necessary. Operating elements are in particular control knobs, levers, buttons or also swivel or hinged handles. Depending on the requirements of the locking movement of the lock, translatoric and arcuate movements can be combined. It is also conceivable that an arcuate movement is provided in particular for the locking operation, whereas a combination of translation and rotation must be applied to effect the unlocking operation. Such an operation could in particular prevent the locking device from being operated unintentionally.

Signaling means are provided in a further embodiment of the invention, which signaling means indicate a locking state. Especially in the case of mounting systems relevant regarding safety, as they are in particular being utilized in the form of safety nets for the cargo-space separation in motor vehicles, an indirect or direct signaling of a correct locking state is desired in order to inform the user of the vehicle directly at the mounting system or through other signaling devices mounted in the vehicle regarding whether the locking action expected from the locked mounting system can indeed be fulfilled.

Optic and acoustic indicators can especially be utilized as signaling means. In the case of optical indicators it is possible in a particularly advantageous manner, when using a controlled force for the locks, to carry out a marking on the operating element which indicates to the user directly upon the operation of the operating system that the desired locking state is achieved. Other optic signaling means can be in particular viewing windows on locks or indicators connected to the locks which give information regarding the lock position. An acoustic signaling of a correct locking state can be achieved especially through an audible clicking or ringing noise upon reaching the correct locking position. Also the detection of the lock positions is conceivable through sensor means and a transfer via electronic paths to the signaling means mounted in the vehicle.

The locking device is in a further embodiment of the invention mounted on a front face of the mounting system. Such a solution is advantageous especially in the case of an elongated contour of the mounting system, as it exists in magazine housings for sun-protection rolls or cargo-space covers. The front face has a surface which is positioned essentially perpendicularly with respect to the direction of the primary extent of the mounting system. The mounting of the locking device on a face of the mounting system means, in particular in the case of the above-mentioned magazine housings, that the locking takes place on an inside surface of the motor vehicle and that at the same time a particularly compact arrangement of the locking device on the mounting system is guaranteed.

BRIEF DESCRIPTION OF THE DRAWINGS

Further advantages and characteristics of the invention result from the claims and the following description of preferred exemplary embodiments of the invention, which are illustrated in the drawings, in which:

FIG. 3 is an isometric illustration of a first exemplary embodiment of a locking device having three locks;

FIG. 4 is an isometric illustration of a second exemplary embodiment of a locking device having a lock and a linearly movable side lock;

FIG. 5 is an isometric illustration of a third exemplary embodiment of a locking device having a lock and arcuately movable side locks;

FIG. 6 is a schematic plan illustration of a structure for the third exemplary embodiment of a lock in the locked position;

FIG. 7 is a schematic plan illustration of a structure for the third exemplary embodiment of a lock in the unlocked position;

FIG. 8 is an isometric illustration of a first modification of the operating means for the first exemplary embodiment of a lock; and FIG. 9 is an isometric illustration of a second modification of the operating means for the first exemplary embodiment of a lock.

DETAILED DESCRIPTION

Figure 1:
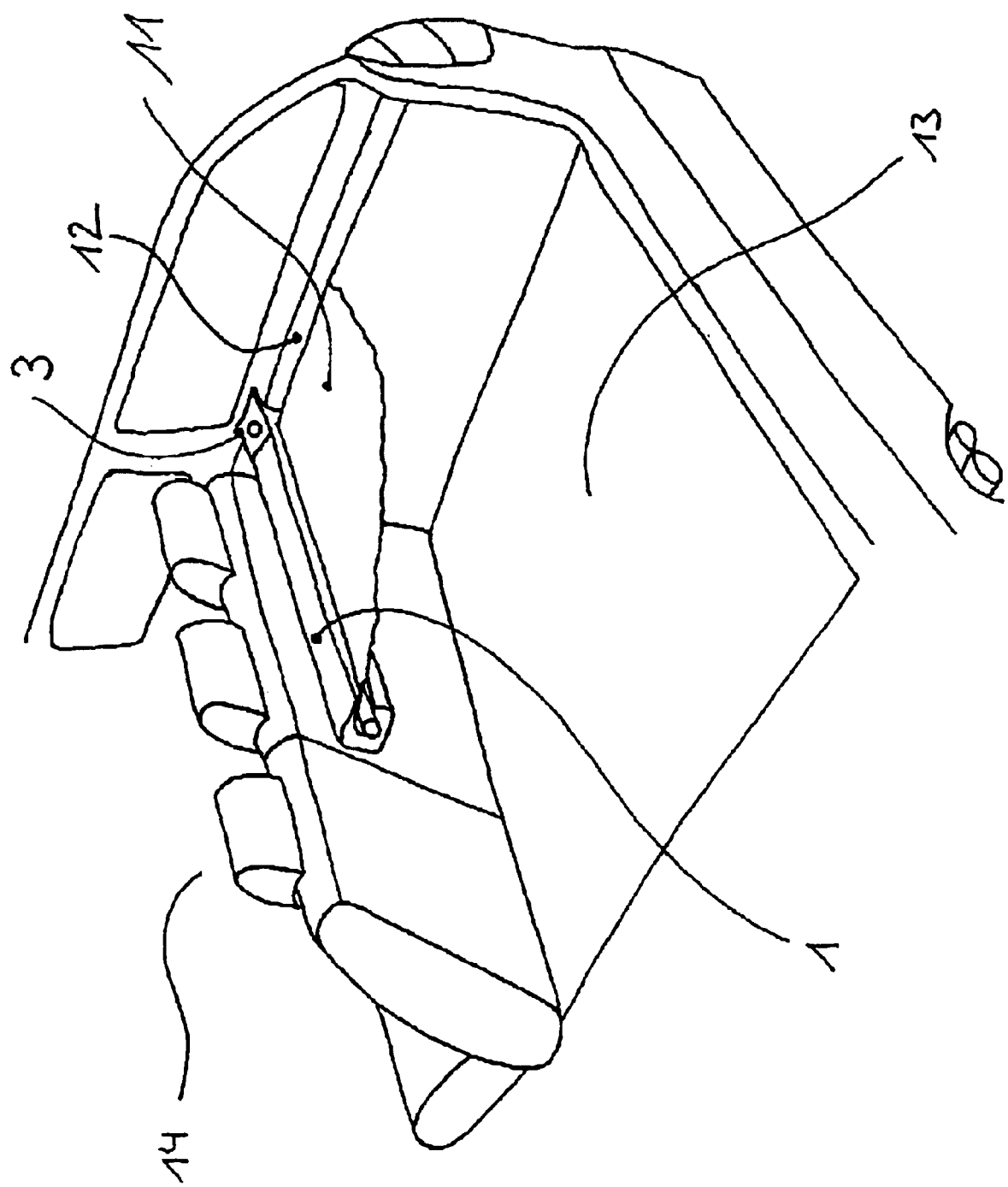
FIG. 1 is an isometric illustration of an inside view of a station wagon having a mounting system locked in place.
Figure 2:
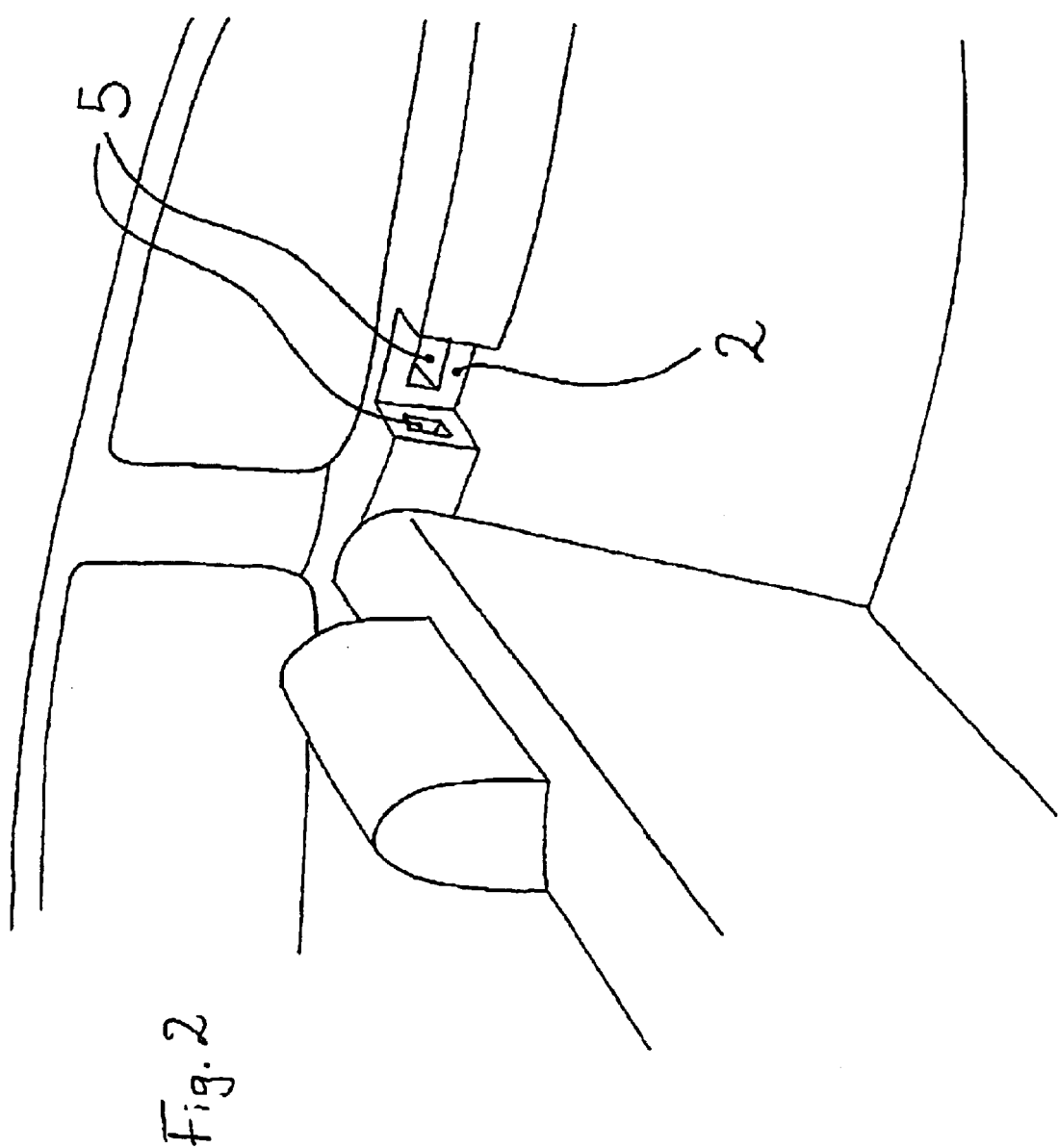
FIG. 2 is an enlarged isometric illustration of a section of the inside of a motor vehicle.

A mounting system 1 is releasably mounted without requiring the use of tools to structure provided on the inside of a motor vehicle and as schematically shown in FIG. 1. The mounting system 1, here a magazine housing for a cargo-space cover 11, is locked power-transferringly through a locking device 3 to a vehicle-fixed retaining device 2 provided in the sidewall 12 of the vehicle. The cargo-space cover 11 is used to separate the cargo area 13 of the motor vehicle from the passenger area 14 and has, aside from a safety function, also a retaining function for unsecured cargo. The vehicle-fixed retaining device 2 illustrated in FIG. 2 is provided on the sidewall 12 of the vehicle at the front end of the cargo area 13. The vehicle-fixed retaining device has several recesses 5 for receiving therein conformingly shaped locks 4, 4a, 4b, 4c, 4d, 7a, 7b. The recesses have differently directed openings. The locking device 3 (FIG. 3), 3a (FIG. 4), 3b (FIG. 5) can, according to the invention, have different type locks 4, 4a, 4b, 4c, 4d, 7a, 7b associated therewith.

FIG. 3 illustrates the locking device 3 which has three locks or latches 4, of which one is arranged on a face of the mounting system 1 extending in a plane that is parallel to a longitudinal axis of the vehicle, whereas two oppositely facing locks 4 are oriented in planes aligned perpendicularly with respect to the plane containing the first mentioned lock of the mounting system 1. All locks or latches 4 illustrated in FIG. 3 can be moved linearly and have a slope at the front facing side, which makes insertion and locking in the retaining device 2 easier. The locks 4 are controlled through the operating system 6 and are pulled back into the locking device 3 to facilitate unlocking.

The locking and unlocking operation of the lock illustrated in FIG. 3 can be caused by an operating means 15c, 15d of the operating system conformingly configured to interact with one another, as they are illustrated in FIGS. 8 and 9. A rotation of the spindle 16c is caused by the conical operating means 15c illustrated in FIG. 8 upon the application of a torque thereto by the user of the vehicle onto the not illustrated operating system, which spindle is supported in the also not illustrated locking device and thus carries out a combined translatoric-rotary movement. This causes the conical area of the operating means 15c to move downwardly and be pressed onto the back sides of the lock 4c and through a wedge action a force to be applied onto each of the locks 4c, which act against the spring force of the initially tensioned spring elements 8c so that a linear movement of the locks 4c in locking direction takes place. The user of the vehicle applies for unlocking a torque onto the operating system in such a manner that the conical area of the operating means 15c is moved upwardly and the action of the force onto the locks 4c is reduced thus causing the locks 4c to be moved back into the unlocking position by the spring force of the spring elements 8c.

The torque introduced by the user of the vehicle into the operating element 6d is in the operating system illustrated in FIG. 9 applied onto a cross-shaped operating means 15d, which has a cam contour and causes by means of these cams a movement of the locks 4d. It is here advantageous that a direction of rotation for the torque applied by the user of the vehicle need not be maintained since a succession of locking and unlocking positions in both directions of rotation results from the symmetrical operating means 15d.

FIG. 4 illustrates a locking device 3a for a mounting system 1a that includes a lock 4a having two side locks 7a. The lock 4a and the side locks 7a are illustrated in a locking position. For unlocking, the side locks 7a are first driven linearly into the lock 4a, the lock 4a can thereafter also be driven back linearly into the locking device 3a by the operating means 6a. The side locks 7a and the lock 4a can be moved by a modification of the operating means illustrated in FIGS. 6 and 7.

FIG. 5 illustrates a locking device 3b for a mounting system 1b in which the lock 4b carries out a linear locking movement, whereas the side locks 7b are supported for an arcuate movement to achieve the locking. Here, just like in FIG. 4, a fixed succession of locking movements is needed in order to achieve a safe locking and unlocking. The operating means 15b for creating a combined arcuate and linear movement are illustrated in FIGS. 6 and 7.

Operating means 15b in the form of cable lines are fastened to the operating element 6b, which cable lines are connected to the side locks 7b. In one locking position according to FIG. 6, the cable lines are almost relaxed, which causes the lock 4b and the side locks 7b to be urged into the locking position by the respectively provided spring elements 8b. An unlocking takes place by applying a torque to the operating element 6b. The cable lines are through this wound onto the operating element 6b and can thus apply a pulling force onto the lock 4b and the side locks 7b.

The spring forces of the spring elements 8b, which spring forces act against the pulling force, are adjusted to one another in such a manner that first the side locks 7b start to move and are driven into the lock 4b. Then through further rotation of the operating element 6b the pulling force onto the lock is further increased so that also the counter force of the spring elements 8c of the lock 4b can be overcome causing the lock 4b to move into the locking device 3b. The energy produced by the user of the vehicle is stored by the compression of the spring elements 8b and 8c and can be utilized for a renewed locking operation.

Although particular preferred embodiments of the invention have been disclosed in detail for illustrative purposes, it will be recognized that variations or modifications of the disclosed apparatus, including the rearrangement of parts, lie within the scope of the present invention.

What is claimed is:

1. A mounting system for a motor vehicle, said mounting system releasably connected to at least one vehicle-fixed retaining device by at least one locking device, wherein the at least one locking device has at least two movable locks, a first one of said locks being movable in a first direction that is parallel to a longitudinal axis of the vehicle, and wherein at least one of said locks is initially tensioned with one spring element at least partially in or against the direction of locking movement.

2. The mounting system according to claim 1, wherein said at least two locks are movably supported independently of one another.

3. The mounting system according to claim 1, wherein a second one of said at least two locks is movably supported for movement in a second direction perpendicular to the first direction.

4. The mounting system according to claim 2, wherein at least one of the locks is controlled by a guiding device to provide a linear and/or arcuate locking movement.

5. The mounting system according to claim 4, wherein the guiding device includes an operating system that force and/or form-lockingly controls the locking and/or unlocking.

6. The mounting system according to claim 5, wherein the operating system includes an automatic controller for facilitating locking and/or unlocking by controlling at least one said lock.

7. The mounting system according to claim 1, wherein at least one of said locks is held by blocking means in a locking position.

8. The mounting system according to claim 1, wherein a guiding device has an operating means for locking and/or unlocking a rotary-motion or sliding-motion operating element.

9. The mounting system according to claim 1, wherein signaling means are provided which indicate a locking condition.

10. The mounting system according to claim 1, wherein the locking device is mounted on a face of the mounting system.

11. A mounting system for a motor vehicle comprising:
a vehicle side wall having a vehicle fixed retaining device;
a locking device for insertion into and locking securement to the vehicle fixed retaining device, said locking device comprising:
a main lock for projecting outwardly from the locking device, said main lock including a side lock mounted therein for projecting laterally from the main lock;
an operating device for controlling linear movement of said main lock outwardly from said locking device and for controlling subsequent outward movement of said side lock from said main lock,
wherein operation of said locking device fixedly secures said locking device to said vehicle fixed retaining structure.

12. The mounting system according to claim 11, wherein said fixed retaining device comprises an opening in the side wall and recesses oriented in a first direction along a longitudinal axis of the vehicle and in a second direction perpendicular to the longitudinal axis, one of said recesses being capable of receiving the main lock and another of said recesses being capable of receiving said side lock.

13. The mounting system according to claim 11, wherein said side lock comprises a first side lock and said locking device includes a second side lock movable between a position within said main lock and a position projecting from said main lock, said first side lock being movable outwardly in a linear direction opposite to a linear direction of movement outwardly of said second side lock.

14. The mounting system according to claim 11, wherein said side lock moves in an arcuate direction.

15. The mounting system according to claim 11, wherein said operating device for controlling movement of said main lock and said side lock comprises:
an operating element including a spring for moving said main lock outwardly;
a cable line connected to the side lock for moving the side lock after the outward movement of said main lock is completed,
wherein said main lock and said side lock, in combination, retain said locking device in the vehicle fixed retaining device.

16. The mounting system according to claim 11, wherein said operating device for controlling movement of said main lock and said side lock comprises:
an operating element including a spring for moving said main lock outwardly, and
a spring element for moving the side lock.

17. A mounting system for a motor vehicle including a vehicle side wall having a vehicle fixed retaining device defined by an opening that includes therein first, second and third recesses, the second and third recesses facing each other, the mounting system comprising:
a locking device for insertion into and locking securement with the vehicle fixed retaining device, said locking device comprising:
a housing;
first, second and third locks located within the housing for projecting outwardly from the housing, said first lock for projecting outwardly in a first direction to mate with the first recess, said second and third locks projecting outwardly in opposing directions to mate with the second and third recesses, respectively, and
an operating device for controlling linear movement of said locks outwardly from said housing,
wherein operation of said locking device fixedly secures said locking device to the vehicle fixed retaining structure.

18. The mounting system according to claim 17, wherein said opposing directions are perpendicular to the first direction and said operating device comprises:
a rotatable spindle secured to an operating element and a spring element for each said lock.

19. The mounting system according to claim 17, wherein said opposing directions are perpendicular to the first direction and said operating device comprises:
a rotatable operating element;
a cross-shaped operating device; and
a spring element for each said lock for biasing the respective said lock toward an inward position.

* * * * *